(12) United States Patent
Ryoo et al.

(10) Patent No.: US 8,111,773 B2
(45) Date of Patent: Feb. 7, 2012

(54) TRANSMISSION METHOD FOR MULTIPLE ANTENNA SYSTEM

(75) Inventors: Sun-Heui Ryoo, Gwacheon Si (KR);
Sae-Woong Bahk, Seocho-gu (KR);
Young-Han Kim, Seocho-gu (KR)

(73) Assignee: Soongsil University research Consortium techno-Park, Seoul (KR)

( * ) Notice: Subject to any disclaimer, the term of this patent is extended or adjusted under 35 U.S.C. 154(b) by 717 days.

(21) Appl. No.: 12/252,772

(22) Filed: Oct. 16, 2008

(65) Prior Publication Data
US 2010/0098184 A1  Apr. 22, 2010

(51) Int. Cl.
*H04B 7/02* (2006.01)
*H04L 1/02* (2006.01)

(52) U.S. Cl. ...................................................... 375/267
(58) Field of Classification Search .................. 375/267; 455/103
See application file for complete search history.

(56) References Cited

U.S. PATENT DOCUMENTS

| | | | |
|---|---|---|---|
| 7,324,481 B2 * | 1/2008 | Kobayashi et al. | 370/334 |
| 2007/0254608 A1 * | 11/2007 | Bougard | 455/103 |
| 2008/0232258 A1 * | 9/2008 | Larsson et al. | 370/238 |

* cited by examiner

*Primary Examiner* — David C. Payne
*Assistant Examiner* — Tanmay Shah
(74) *Attorney, Agent, or Firm* — Sherr & Vaughn, PLLC

(57) ABSTRACT

A transmission method for a multiple antenna system including a first device having M (>1) transmitting antennas and a second device having N (>1) receiving antennas is disclosed. The method includes determining whether there is a multiple-input multiple-output (MIMO) transmission scheme satisfying a condition that it consumes less energy than a single-input single-output (SISO) transmission scheme to transmit a frame at a given transmission power, among one or more MIMO transmission schemes available to the first device and the second device, the one or more MIMO transmission schemes being determined by the numbers of activated transmitting and receiving antennas, and MIMO code; determining a transmission mode as a MIMO mode when there is the at least one MIMO transmission scheme satisfying the condition, and otherwise determining the transmission mode as a SISO mode; and performing frame transmission from the first device to the second device in the determined transmission mode. Thus, frame transmission with power saving can be performed.

6 Claims, 3 Drawing Sheets

TRANSMISSION METHOD FOR MULTIPLE ANTENNA SYSTEM

BACKGROUND OF THE INVENTION

1. Field of the Invention

The present invention relates to a transmission method for a multiple antenna system, and more particularly, but not exclusively, to a power-saving transmission method.

2. Discussion of Related Art

A multiple antenna system which is attracting attention as primary technology for a next-generation wireless communication system has advantages of being able to improve communication reliability using a plurality of independent transmission paths and increase a communication transfer rate using an independent spatial channel. These advantages are associated with diversity gain and multiplexing gain, respectively. These two gains coexist and have a diversity-multiplexing tradeoff (DMT) relationship wherein when one of the gains increases, the other decreases. Related technology includes a technique of switching among multiple-input multiple-output (MIMO) transmission schemes in view of a DMT relationship and a channel state to maximize a data transfer rate.

Meanwhile, the multiple antenna technology having the above advantages is even being applied to ubiquitous networking using compact mobile wireless devices (i.e., mobile devices). Since most mobile devices are powered by batteries, they have a limited operation time and inconveniently require charging or changing of the batteries.

Accordingly, there is a need for a power-saving transmission method in a multiple antenna system having limited energy.

SUMMARY OF THE INVENTION

The present invention is directed to a power-saving transmission method in a multiple antenna system.

A first aspect of the present invention provides a transmission method for a multiple-input multiple-output (MIMO) system including a first device having M (>1) transmitting antennas and a second device having N (>1) receiving antennas, the method including: determining whether there is at least one MIMO transmission scheme satisfying a condition that it consumes less energy than a single-input single-output (SISO) transmission scheme to transmit a frame at a given transmission power, among one or more MIMO transmission schemes available to the first device and the second device, the one or more MIMO transmission schemes being determined by the numbers of activated transmitting and receiving antennas, and MIMO code; determining a transmission mode as a MIMO mode when there is the at least one MIMO transmission scheme satisfying the condition, and otherwise determining the transmission mode as a SISO mode; and performing frame transmission from the first device to the second device in the determined transmission mode.

Here, the MIMO mode is a mode in which one of one or more candidate MIMO transmission schemes is selected and used for frame transmission, the one or more candidate MIMO transmission schemes being MIMO schemes satisfying the condition among the one or more available MIMO transmission schemes, and the energy includes energy consumed by at least one device requiring power saving among the devices.

Determining whether there is at least one MIMO transmission scheme may include: calculating a minimum multiplexing gain that is for consuming the same energy as in the SISO transmission scheme to transmit a frame at the given transmission power; and determining whether there is a MIMO transmission scheme having a greater multiplexing gain than the minimum multiplexing gain among the one or more available MIMO transmission schemes.

Calculating the minimum multiplexing gain may include calculating the minimum multiplexing gain $r_{min}$ using the following expression:

$$r_{min} = \min_{i \in \Psi} \frac{(S_T(P_T + m_i P_{ct}) + S_R(n_i P_{cr}))}{(S_T(P_T + P_{ct}) + S_R(P_{cr}))}$$

where $\Psi$ denotes a set including the one or more available MIMO transmission schemes, i denotes an index of the MIMO transmission scheme, $m_i$ and $n_i$ denote the numbers of activated transmitting and receiving antennas in the i-th MIMO transmission scheme, respectively, $P_T$ denotes the given transmission power, $P_{ct}$ denotes power consumed for frame transmission by at least some circuits except a power amplifier in the first device, $P_{cr}$ denotes power consumed for frame reception by at least some circuits in the second device, $S_T$ is equal to 1 if the first device requires power saving and otherwise is equal to 0, and SR is equal to 1 if the second device requires power saving and otherwise is equal to 0.

Each of the one or more available MIMO transmission schemes may use M transmitting antennas and N receiving antennas, and calculating the minimum multiplexing gain may include calculating a minimum multiplexing gain $r_{min}$ using the following expression:

$$r_{min} = \frac{(S_T(P_T + M \cdot P_{ct}) + S_R(N \cdot P_{cr}))}{(S_T(P_T + P_{ct}) + S_R(P_{cr}))}$$

where i denotes an index of the MIMO transmission scheme, $P_T$ denotes the given transmission power, $P_{ct}$ denotes power consumed for frame transmission by at least some circuits except a power amplifier in the first device, $P_{cr}$ denotes power consumed for frame reception by at least some circuits in the second device, $S_T$ is equal to 1 if the first device requires power saving and otherwise is equal to 0, and $S_R$ is equal to 1 if the second device requires power saving and otherwise is equal to 0.

$P_{ct}$ may include power consumed for frame transmission by radio frequency (RF) circuits of the first device, and $P_{cr}$ may include power consumed for frame reception by RF circuits of the second device.

If the first device is a battery-driven device, $S_T$ may be equal to 1 and otherwise equal to 0, and if the second device is a battery-driven device, $S_R$ may be equal to 1 and otherwise equal to 0.

Performing the frame transmission may include: when the determined transmission mode is a MIMO mode, selecting a MIMO transmission scheme consuming the least energy to satisfy an outage requirement in a given channel state, from among the one or more candidate MIMO transmission schemes; and performing the frame transmission using the selected MIMO transmission scheme.

Selecting the MIMO transmission scheme may include selecting a MIMO transmission scheme determined by the following expression:

$$\operatorname*{argmin}_{i \in \Theta}\{\alpha_i T_{on\_i}(S_T(P_T + m_i P_{ct}) + S_R(n_i P_{cr}))\}$$

where $\Theta$ denotes a set including the one or more candidate MIMO transmission schemes, i denotes an index of the candidate MIMO transmission scheme, $\alpha_i$ denotes the number of transmissions in the i-th candidate MIMO transmission scheme necessary to satisfy an outage requirement for frame transmission in a given channel state, $T_{ON\_i}$ denotes a time taken for the i-th candidate MIMO transmission scheme to transmit one frame, and $m_i$ and $n_i$ denote the numbers of activated transmitting and receiving antennas in the i-th candidate MIMO transmission scheme, respectively.

Each of the one or more available MIMO transmission schemes may use M transmitting antennas and N receiving antennas, and the method may further include: selecting a MIMO transmission scheme having the smallest value that is proportional to the number of transmissions necessary to satisfy the outage requirement for frame transmission in a given channel state and inversely proportional to a multiplexing gain, from among the one or more candidate MIMO transmission schemes.

Performing the frame transmission may include performing frame transmission in the determined transmission mode for a predetermined period of time and then returning to determining whether there is at least one MIMO transmission scheme.

BRIEF DESCRIPTION OF THE DRAWINGS

The above and other objects, features and advantages of the present invention will become more apparent to those of ordinary skill in the art by describing in detail preferred exemplary embodiments thereof with reference to the attached drawings, in which.

DETAILED DESCRIPTION OF EXEMPLARY EMBODIMENTS

The present invention will now be described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will be sufficiently thorough and complete to fully enable those skilled in the art to embody and practice the invention.

Meanwhile, the terminology used herein is chosen to describe particular exemplary embodiments only and is not intended to limit the scope of the invention.

The terms "first" and "second" may be used herein to distinguish one element from another, and should not be construed as limiting the present invention. For example, a "first" element could be termed a "second" element and vice versa without departing from the teachings of the present invention.

The term "and/or" includes any and all combinations of one or more of associated listed items. For example, "a first item, a second item and/or a third item" means "at least one of the first item, the second item, and the third item." That is, it means any and all combinations of two or more of the first, the second, and the third item, as well as any one of the first, the second, and the third item.

Although articles like "a", "an" and "the" indicate that an element is singular, it may in fact be plural, unless the context clearly indicates otherwise. It will be further understood that the terms "comprise", "include", and "have", when used in this specification, specify the presence of stated features, numbers, steps, operations, elements, and/or components, but do not preclude the presence or addition of one or more other features, numbers, steps, operations, elements, components, and/or groups thereof.

Process steps described in this disclosure may be performed differently from a specified order, unless a specific order is clearly stated in the context of the disclosure. That is, each step may be performed in a specified order, at substantially the same time, or in a reverse order.

Unless otherwise defined, all terms (including technical and scientific terms) used herein have the same meanings as commonly understood by one of ordinary skill in the art to which this invention pertains. It will be further understood that terms defined in common dictionaries should be interpreted within the context of the relevant art and not in an idealized or overly formal sense unless expressly so defined herein.

Figure 1:
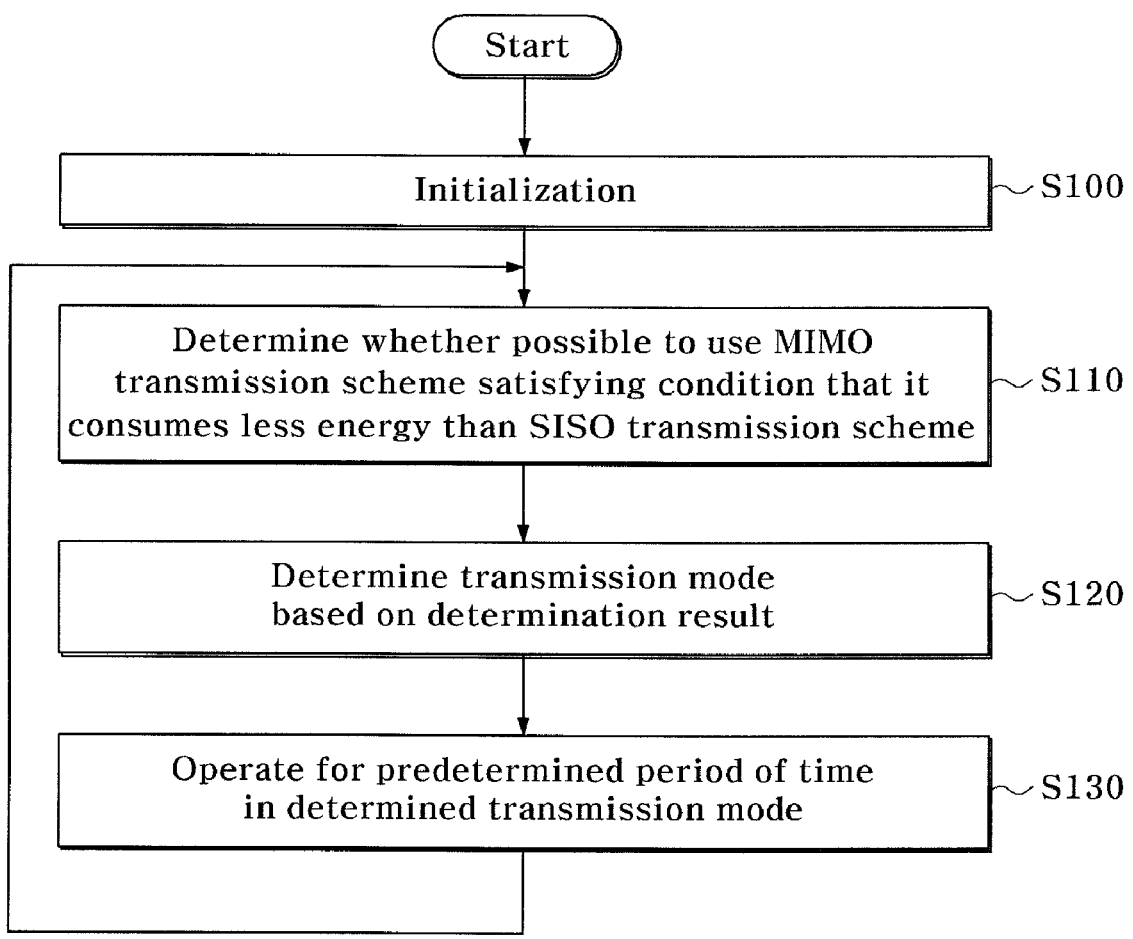
FIG. 1 is a flowchart illustrating a transmission method according to an exemplary embodiment of the present invention.

FIG. 1 is a flowchart illustrating a transmission method according to an exemplary embodiment of the present invention.

It is assumed in FIG. 1 that in a wireless network system, a first device having M (>1) transmitting antennas transmits a frame to a second device having N (>1) receiving antennas. Here, the first and second devices are wireless stations of an IEEE802.11n system, but are not limited thereto. The first and second devices may be any wireless communication devices having a plurality of antennas.

In step S100, an initialization operation is performed.

In the initialization operation, a set $\Psi$ including at least one MIMO transmission scheme available to the first and second devices may be set, values $P_{ct}$, $P_{cr}$, $S_T$, and $S_R$, which will be described later, may be set, and a table indicating a relationship between each channel state and $\alpha$ may be set. The initialization operation is not limited to these operations.

In an exemplary embodiment of the present invention, the set $\Psi$ may be set by the first and second devices exchanging information on the number of antennas they have and MIMO code they support. This is because a MIMO transmission scheme is determined by the numbers of activated transmitting and receiving antennas, and the MIMO code. In an exemplary embodiment of the present invention, the information exchange uses a single-input single-output (SISO) transmission scheme. Meanwhile, if all devices in the wireless network system support the same set $\Psi$, the set $\Psi$ may be predefined without the information exchange.

In an exemplary embodiment of the present invention, the values $P_{ct}$ and $P_{cr}$ may be set by the first device providing information on a predefined value $P_{ct}$ to the second device or by the second device providing information on a predefined value $P_{cr}$ to the first device. In an exemplary embodiment of the present invention, the information exchange uses a SISO transmission scheme. Meanwhile, if all devices in the wireless network system have the same values $P_{ct}$ and $P_{cr}$, the values $P_{ct}$ and $P_{cr}$ may be predefined without the information exchange.

In an exemplary embodiment of the present invention, the values $S_T$ and $S_R$ may be set by the first device indicating to the second device that the first device is a power-saving object or by the second device indicating to the first device that the second device is a power-saving object. The present invention is not limited to this scenario. For example, the first device may indicate to the second device that the first device is a battery-driven device or the second device may indicate to the first device that the second device is a battery-driven device. In an exemplary embodiment of the present invention, a SISO transmission scheme is used to exchange such information. Meanwhile, if all devices in the wireless network system are power-saving objects, the values $S_T$ and $S_R$ may be predefined as 1 without the information exchange.

In step S110, the first or second device determines whether a MIMO transmission scheme satisfying a condition that it consumes less energy than the SISO transmission scheme to transmit a frame at a given transmission power $P_T$ exists in the set $\Psi$.

Here, the transmission power $P_T$ may be determined by the first or second device according to a channel state. In this case, the transmission power $P_T$ may be updated by link adaptation at time intervals $T_p$, which will be described later. Alternatively, the transmission power $P_T$ may be fixed.

The energy considered in step S110 includes energy consumed by at least one of the first and second devices requiring power saving.

Figure 2:
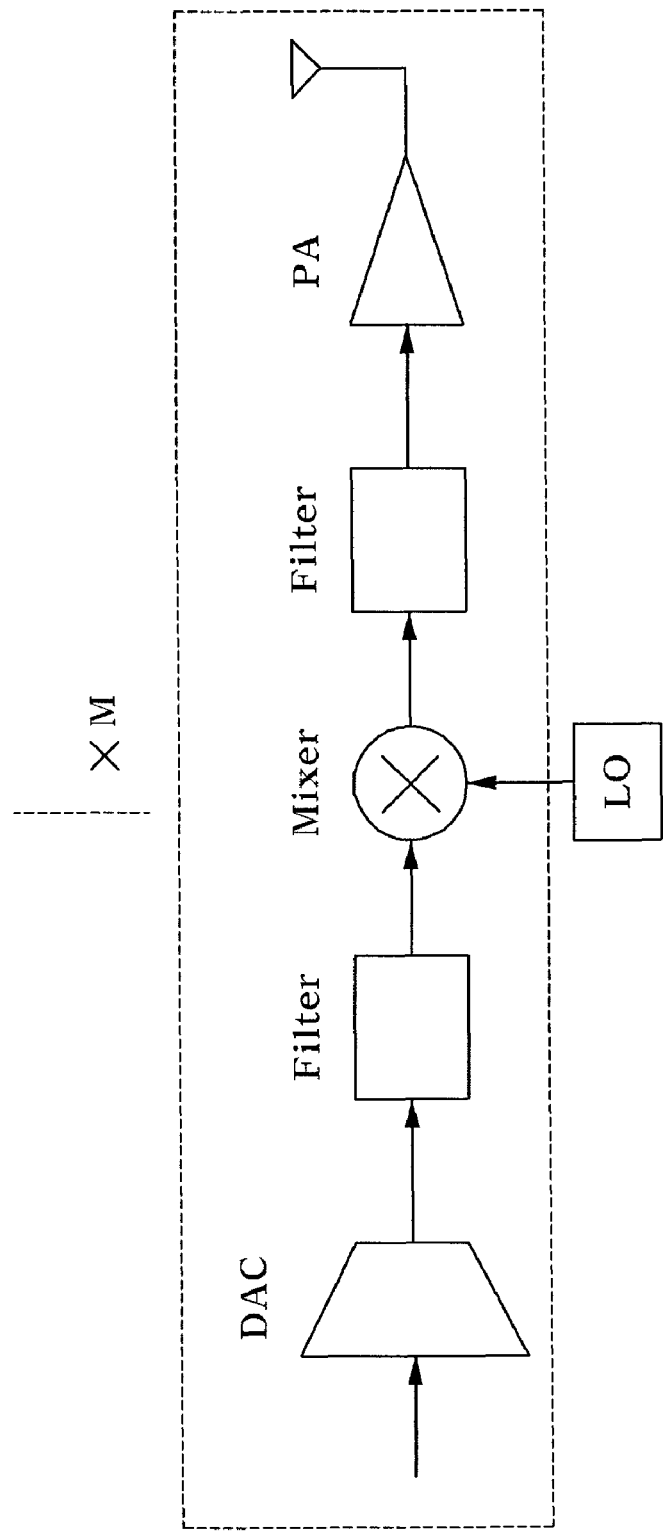
FIGS. 2 and 3 respectively illustrate a portion of a transmission stage of a first device and a portion of a receiving stage of a second device to explain energy considered in the present invention.
Figure 3:
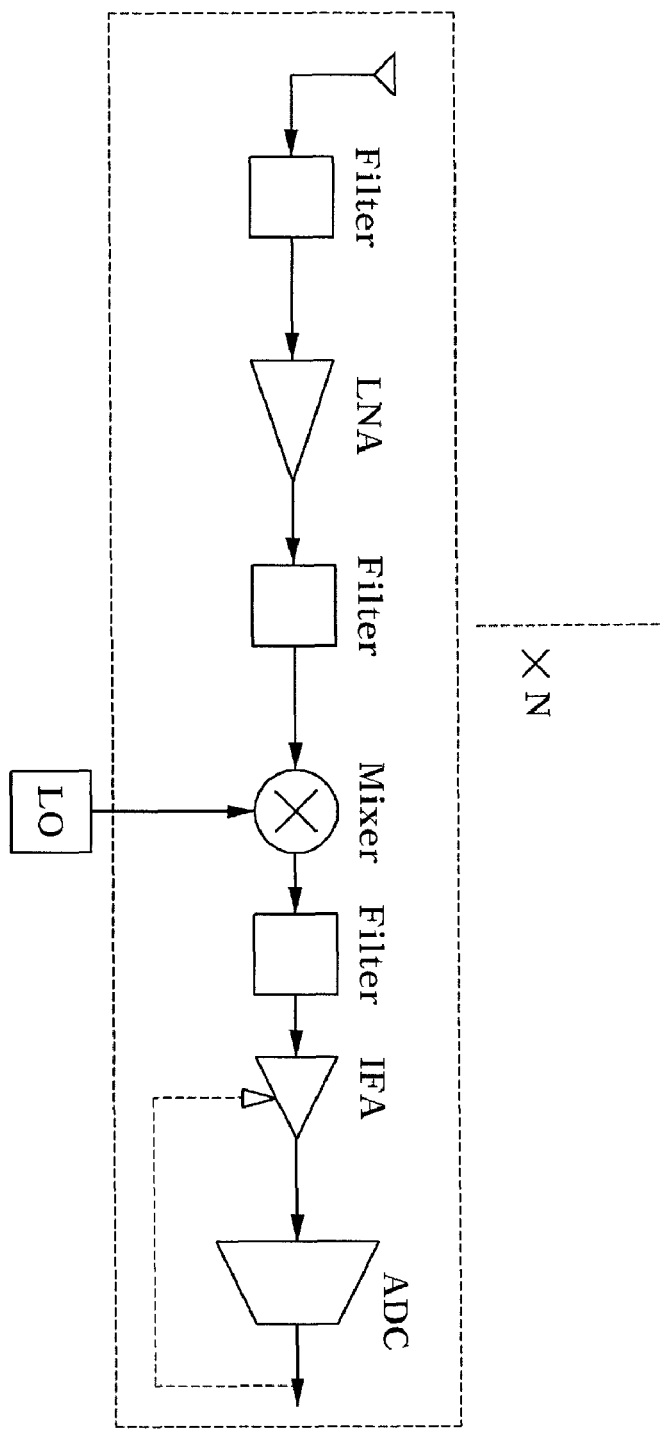

FIGS. 2 and 3 respectively illustrate a portion of a transmission stage of the first device and a portion of a receiving stage of the second device to explain the energy considered in the present invention.

Referring to FIG. 2, in the transmission stage of the first device, analog circuits associated with each transmitting antenna include a digital-to-analog converter (DAC), two filters, a mixer, a local oscillator (LO), and a power amplifier (PA).

Referring to FIG. 3, in the receiving stage of the second device, analog circuits associated with each receiving antenna include two filters, a low noise amplifier (LNA), a mixer, a local oscillator, an intermediate frequency amplifier, and an analog-to-digital converter (ADC).

Except for a base-band processing unit, only RF circuits are shown in FIGS. 2 and 3 because RF circuits generally consume more energy than other circuits. Energy $E_i$ consumed by the i-th MIMO transmission scheme in the set $\Psi$ for frame transmission/reception may be approximated by Expression 1:

$$E_i = (P_T + m_i P_{ct} + n_i P_{cr}) T_{on\_i} \qquad \text{Expression 1}$$

where $m_i$ and $n_i$ denote the numbers of activated transmitting and receiving antennas used by the i-th MIMO transmission scheme, respectively. Accordingly, $m_i$ is smaller than or equal to M, and $n_i$ is smaller than or equal to N.

$P_T$ denotes the above transmission power, which is the sum of powers consumed by power amplifiers associated with $m_i$ transmitting antennas. That is, the power amplifiers associated with the respective transmitting antennas consume power of $P_T/m_i$ for frame transmission.

$P_{ct}$ denotes power consumed for frame transmission by the analog circuits (e.g., the DAC, the filters, and the mixer in FIG. 2) except the power amplifier in the first device, and $P_{cr}$ denotes power consumed for frame reception by the analog circuits (e.g., the filters, the LNA, the mixer, the IFA, and the ADC in FIG. 2) in the second device.

$T_{on\_i}$ denotes a time taken for the i-th MIMO transmission scheme to transmit one frame. $T_{on\_i} = L/R_i$, where L denotes a length of the frame (e.g., the number of bits), and $R_i$ denotes a transfer rate of the i-th MIMO transmission scheme. $R_i$ may be determined by $r_i \log(\rho)$ through a theoretical capacity approximation formula. Here, $r_i$ denotes a multiplexing gain of the i-th MIMO transmission scheme, and $\rho$ denotes a signal to noise ratio (SNR) of a channel. $\rho$ is determined by the transmission power PT and an additive white Gaussian noise (AWGN) distribution value of the receiving stage.

Similarly, energy $E_{SISO}$ consumed for frame transmission/reception by the SISO transmission scheme may be approximated as in Expression 2:

$$E_{SISO} = (P_T + P_{ct} + P_{cr}) T_{on\_SISO} \qquad \text{Expression 2}$$

where $T_{on\_i}$ denotes a time taken for the SISO transmission scheme to transmit one frame. $T_{on\_SISO} = L/R_{SISO}$. A transfer rate $R_{SISO}$ of the SISO transmission scheme may be determined by $\log(\rho)$ through a theoretical capacity approximation formula.

Using Expressions 1 and 2, $R_i = r_i \log(\rho)$, and $R_{SISO} = \log(\mu)$, $E_i/E_{SISO}$ may be represented by Expression 3:

$$E_i/E_{SISO} = \frac{(S_T(P_T + m_i P_{ct}) + S_R(n_i P_{cr}))}{(S_T(P_T + P_{ct}) + S_R(P_{cr}))r_i} \qquad \text{Expression 3}$$

Values $S_T$ and $S_R$ are included in Expression 3 to consider only energy consumed by a device that is a power-saving object. When the first device requires power saving, $S_T$ is equal to 1 and otherwise is equal to 0, and when the second device requires power saving, $S_R$ is equal to 1 and otherwise is equal to 0. For example, an 802.11 access point (AP) is an example of a device that does not require power saving, and an 802.11 non-AP station is an example of a device that requires power saving.

When $E_i/E_{SISO} > 1$ in Expression 3, the i-th MIMO transmission scheme satisfies a condition that it consumes less energy than the SISO transmission scheme to transmit a frame at a given transmission power $P_T$.

Using Expression 3, a multiplexing gain for consuming the same energy as in the SISO transmission scheme to transmit a frame at the given transmission power, i.e., a minimum multiplexing gain $r_{min}$, is given by Expression 4:

$$r_{min} = \min_{i \in \Psi} \frac{(S_T(P_T + m_i P_{ct}) + S_R(n_i P_{cr}))}{(S_T(P_T + P_{ct}) + S_R(P_{cr}))} \qquad \text{Equation 4}$$

Meanwhile, when all MIMO transmission schemes in the set $\Psi$ use M transmitting antennas and N receiving antennas, Expression 4 may be simplified into Expression 5:

$$r_{min} = \frac{(S_T(P_T + M \cdot P_{ct}) + S_R(N \cdot P_{cr}))}{(S_T(P_T + P_{ct}) + S_R(P_{cr}))} \qquad \text{Expression 5}$$

In view of Expressions 4 and 5, step S120 according to an exemplary embodiment includes steps of calculating the minimum multiplexing gain $r_{min}$; and determining whether a MIMO transmission scheme having a multiplexing gain greater than the minimum multiplexing gain exists among the one or more available MIMO transmission schemes. When the MIMO transmission scheme having a multiplexing gain greater than the minimum multiplexing gain exists in the set Ψ, a transmission mode is determined as a MIMO transmission mode in step S120.

In step S120, when there is at least one MIMO transmission scheme satisfying the condition, the first or second device determines the transmission mode as the MIMO mode, and otherwise determines the transmission mode as a SISO mode. The first or second device then indicates the determined transmission mode to the second or first device. Here, the MIMO mode is a mode in which one of the one or more candidate MIMO transmission schemes, i.e., one of MIMO schemes satisfying the condition from among the one or more available MIMO transmission schemes, is selected and used for frame transmission, and the SISO mode is a mode in which the first device transmits a frame using one transmitting antenna and the second device receives the frame using one receiving antenna.

In step S130, the first device transmits the frame to the second device for a predetermined period of time $T_p$ in the determined transmission mode and then returns to step S110.

Here, the predetermined period of time means a period of time for which a channel state can be kept unchanged. That is, a MIMO transmission scheme or a SISO transmission scheme is determined at certain time intervals according to a channel state. Also, the transmission power $P_T$ may be determined at certain time intervals according to the channel state. When $T_p$ is small, a lot of wireless resources are used for signaling between the first device and the second device while effective adaptation to a fast change in channel state is allowed. In view of this point, $T_p$ is predefined.

When the transmission mode determined in step S120 is the MIMO mode, step S130 according to an exemplary embodiment includes steps of: selecting, by the first or second device, a MIMO transmission scheme consuming the least energy to satisfy an outage requirement in a given channel state ρ from among the one or more candidate MIMO transmission schemes; indicating, by the first or second device, the selected MIMO transmission scheme to the second or first device; and performing, by the first device, frame transmission using the selected MIMO transmission scheme.

The device for selecting the MIMO transmission scheme (i.e., the first or second device) must estimate the channel state value ρ. In this case, the device for selecting the MIMO transmission scheme may directly estimate the channel state value ρ, or may receive the estimated value from the correspondent device.

An example of the outage requirement for the i-th MIMO scheme may include $P_o(\rho,R_i) \leq P_{req}$, where $R_i$ denotes a transfer rate of the i-th MIMO transmission scheme, and $P_{req}$ denotes a required outage probability value. Also, $P_o(\rho,R_i)$ denotes a probability that the frame transmission will fail for a given channel states value ρ and $R_i$.

The MIMO transmission scheme consuming the least energy to satisfy the outage requirement in a given channel state may be selected by using Expression 6 or 7. Expression 6 considers energy until the number of transmissions $\alpha_i$:

$$\operatorname*{argmin}_{i \in \Theta}\{\alpha_i T_{on\_i}(S_T(P_T + m_i P_{ct}) + S_R(n_i P_{cr}))\} \quad \text{Expression 6}$$

where Θ denotes a set including the one or more candidate MIMO transmission schemes, i denotes an index of the candidate MIMO transmission scheme, $\alpha_i$ denotes the number of transmissions in the i-th candidate MIMO transmission scheme necessary to satisfy the outage requirement for frame transmission in a given channel state, and $T_{ON\_i}$ denotes a time taken for the i-th candidate MIMO transmission scheme to transmit one frame. $m_i$ and $n_i$ denote the numbers of activated transmitting and receiving antennas in the i-th candidate MIMO transmission scheme, respectively.

$\alpha_i$ depends on $P_o(\rho,R_i)$ and a combining scheme in retransmission (e.g., a chase combining scheme). Alternatively, $\alpha_i$ may be determined using the table set in step S100.

Meanwhile, when all the candidate MIMO transmission schemes in the set Θ use M transmitting antennas and N receiving antennas, Expression 6 is simplified into Expression 7 according to $T_{ON\_i}=L/(r_i \log(\rho))$:

$$\operatorname*{argmin}_{i \in \Theta}\left\{\frac{\alpha_i}{r_i}\right\} \quad \text{Expression 7}$$

That is, when Expression 7 is used, the first or second device selects a MIMO transmission scheme having the smallest value that is proportional to the number of transmissions $\alpha_i$ necessary to satisfy the outage requirement for frame transmission in a given channel state ρ and inversely proportional to the multiplexing gain $r_i$ from among the candidate MIMO transmission schemes in the set Θ.

The present invention may be implemented as machine-readable codes on a machine-readable medium. The machine-readable medium includes any type of recording device for storing machine-readable data. Examples of the machine-readable recording medium include a read-only memory (ROM), a random access memory (RAM), a compact disk-read only memory (CD-ROM), a magnetic tape, a floppy disk, and optical data storage. The medium may also be carrier waves (e.g., Internet transmission). The computer-readable recording medium may be distributed among networked machine systems which store and execute machine-readable codes in a de-centralized manner. Functional programs, codes, and code segments for implementing the present invention may be easily inferred by programmers in the art to which the present invention belongs.

According to an exemplary embodiment of the present invention, frame transmission with power saving can be performed.

According to an exemplary embodiment of the present invention, a MIMO transmission scheme consuming minimum power while satisfying a reliability requirement is selected based on the channel state, thereby maximizing an operation time of a wireless device.

Not all exemplary embodiments of the present invention necessarily have all of the advantages of the present invention. Thus, the present invention should not be construed as limited by its advantages.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method comprising transmission in a multiple-input multiple-output (MIMO) system, wherein the MIMO system comprises a first device having M (>1) transmitting antennas and a second device having N (>1) receiving antennas, wherein the method comprises:
   determining if there is at least one MIMO transmission scheme satisfying a that consumes less energy than a single-input single-output (SISO) transmission scheme to transmit a frame at a given transmission power, wherein said at least one MIMO transmission scheme comprises at least one MIMO transmission schemes available to the first device and the second device, wherein said at least one MIMO transmission schemes is selected based on a number of activated transmitting and receiving antennas and based on a MIMO code;

selecting a MIMO mode as a transmission mode if said at least one MIMO transmission scheme consumes less energy than the single-input single-output (SISO) transmission scheme and selecting a SISO mode as the transmission mode if said at least one MIMO transmission scheme consumes more energy than the single-input single-output (SISO) transmission scheme, wherein said determining comprises:

calculating a minimum multiplexing gain of each of said at least one MIMO transmission scheme to transmit a frame at a given transmission power; and determining if the minimum multiplexing gain of at least one of said at least one MIMO transmission scheme has a multiplexing gain less than the minimum multiplexing gain of the SISO transmission scheme, wherein:

said calculating the minimum multiplexing gain of each of said at least one MIMO transmission scheme comprises calculating a minimum multiplexing gain $r_{min}$ using the expression $$r_{min} = \min_{i \in \Psi} \frac{(S_T(P_T + m_i P_{ct}) + S_R(n_i P_{cr}))}{(S_T(P_T + P_{ci}) + S_R(P_{cr}))};$$

$\Psi$ denotes a set comprising said at least one MIMO transmission schemes;

i denotes an index of the MIMO transmission scheme;

$m_i$ and $n_i$ respectively denotes the numbers of activated transmitting and receiving antennas in the i-th MIMO transmission scheme;

$P_T$ denotes the given transmission power;

$P_{ct}$ denotes power consumed for frame transmission by at least some circuits not including a power amplifier in the first device;

$P_{cr}$ denotes power consumed for frame reception by at least some circuits in the second device;

$S_T$ is equal to 1 if the first device requires power saving and otherwise is equal to 0; and SR is equal to 1 if the second device requires power saving and otherwise is equal to 0.

2. The method of claim 1, wherein:

$P_{ct}$ comprises power consumed for frame transmission by radio frequency (RF) circuits of the first device, and $P_{cr}$ comprises power consumed for frame reception by RF circuits of the second device.

3. The method of claim 1, wherein:

if the first device is a battery-driven device, $S_T$ is equal to 1 and otherwise is equal to 0, and if the second device is a battery-driven device, $S_R$ is equal to 1 and otherwise is equal to 0.

4. A method comprising transmission in a multiple-input multiple-output (MIMO) system, wherein the MIMO system comprises a first device having M (>1) transmitting antennas and a second device having N (>1) receiving antennas, wherein the method comprises:

determining if there is at least one MIMO transmission scheme satisfying a that consumes less energy than a single-input single-output (SISO) transmission scheme to transmit a frame at a given transmission power, wherein said at least one MIMO transmission scheme comprises at least one MIMO transmission schemes available to the first device and the second device, wherein said at least one MIMO transmission schemes is selected based on a number of activated transmitting and receiving antennas and based on a MIMO code;

selecting a MIMO mode as a transmission mode if said at least one MIMO transmission scheme consumes less energy than the single-input single-output (SISO) transmission scheme and selecting a SISO mode as the transmission mode if said at least one MIMO transmission scheme consumes more energy than the single-input single-output (SISO) transmission scheme, wherein said determining comprises:

calculating a minimum multiplexing gain of each of said at least one MIMO transmission scheme to transmit a frame at a given transmission power; and determining if the minimum multiplexing gain of at least one of said at least one MIMO transmission scheme has a multiplexing gain less than the minimum multiplexing gain of the SISO transmission scheme, wherein:

each of said at least one MIMO transmission schemes uses M transmitting antennas and N receiving antennas;

calculating the minimum multiplexing gain comprises calculating a minimum multiplexing gain $r_{min}$ using the expression $$r_{min} = \frac{(S_T(P_T + M \cdot P_{ct}) + S_R(N \cdot P_{cr}))}{(S_T(P_T + P_{ct}) + S_R(P_{cr}))}$$

i denotes an index of the MIMO transmission scheme;

$P_T$ denotes the given transmission power;

$P_{ct}$ denotes power consumed for frame transmission by at least some circuits not including a power amplifier in the first device;

$P_{cr}$ denotes power consumed for frame reception by at least some circuits in the second device;

$S_T$ is equal to 1 if the first device requires power saving and otherwise is equal to 0; and $S_R$ is equal to 1 if the second device requires power saving and otherwise is equal to 0.

5. A method comprising transmission in a multiple-input multiple-output (MIMO) system, wherein the MIMO system comprises a first device having M (>1) transmitting antennas and a second device having N (>1) receiving antennas, wherein the method comprises:

determining if there is at least one MIMO transmission scheme satisfying a that consumes less energy than a single-input single-output (SISO) transmission scheme to transmit a frame at a given transmission power, wherein said at least one MIMO transmission scheme comprises at least one MIMO transmission schemes available to the first device and the second device, wherein said at least one MIMO transmission schemes is selected based on a number of activated transmitting and receiving antennas and based on a MIMO code;

selecting a MIMO mode as a transmission mode if said at least one MIMO transmission scheme consumes less energy than the single-input single-output (SISO) transmission scheme and selecting a SISO mode as the transmission mode if said at least one MIMO transmission scheme consumes more energy than the single-input single-output (SISO) transmission scheme, wherein:
if the MIMO mode is selected, then selecting a MIMO transmission scheme of said at least one MIMO mode that consumes the least energy to satisfy an outage requirement in a given channel state; and
performing frame transmission using the selected MIMO transmission scheme,
wherein:
said selecting the MIMO transmission scheme comprises using the expression $$\operatorname*{argmin}_{i\in\Theta}\{\alpha_i T_{on\_i}(S_T(P_T + m_i P_{ct}) + S_R(n_i P_{cr}))\};$$

Θ denotes a set including said at least one MIMO transmission scheme;
i denotes an index of each of said at least one MIMO transmission scheme;
$\alpha_i$ denotes the number of transmissions in the i-th said at least one MIMO transmission scheme necessary to satisfy an outage requirement for frame transmission in a given channel state;
$T_{ON\_i}$ denotes a time taken for the i-th said at least one MIMO transmission scheme to transmit one frame; and
$m_i$ and $n_i$ respectively denote the numbers of activated transmitting and receiving antennas in the i-th said at least one MIMO transmission scheme.

6. A method comprising transmission in a multiple-input multiple-output (MIMO) system, wherein the MIMO system comprises a first device having M (>1) transmitting antennas and a second device having N (>1) receiving antennas, wherein the method comprises:
determining if there is at least one MIMO transmission scheme satisfying a that consumes less energy than a single-input single-output (SISO) transmission scheme to transmit a frame at a given transmission power, wherein said at least one MIMO transmission scheme comprises at least one MIMO transmission schemes available to the first device and the second device, wherein said at least one MIMO transmission schemes is selected based on a number of activated transmitting and receiving antennas and based on a MIMO code;
selecting a MIMO mode as a transmission mode if said at least one MIMO transmission scheme consumes less energy than the single-input single-output (SISO) transmission scheme and selecting a SISO mode as the transmission mode if said at least one MIMO transmission scheme consumes more energy than the single-input single-output (SISO) transmission scheme,
wherein:
if the MIMO mode is selected, then selecting a MIMO transmission scheme of said at least one MIMO mode that consumes the least energy to satisfy an outage requirement in a given channel state; and
performing frame transmission using the selected MIMO transmission scheme,
wherein:
each of said at least one MIMO transmission scheme uses M transmitting antennas and N receiving antennas, and
the method comprises selecting a MIMO transmission scheme of said at least one MIMO transmission scheme having the smallest value that is proportional to the number of transmissions necessary to satisfy the outage requirement for frame transmission in a given channel state and inversely proportional to a multiplexing gain of said at least one MIMO transmission scheme.

* * * * *